United States Patent [19]
Greene et al.

[11] Patent Number: 6,019,825
[45] Date of Patent: Feb. 1, 2000

[54] HYDROCYCLONE GAS SEPARATOR

[75] Inventors: Boyd Greene; Naji Nassif, both of Memphis, Tenn.

[73] Assignee: Gnesys, Inc., Memphis, Tenn.

[21] Appl. No.: 09/051,179

[22] PCT Filed: Oct. 18, 1996

[86] PCT No.: PCT/US96/16784

§ 371 Date: Apr. 3, 1998

§ 102(e) Date: Apr. 3, 1998

[87] PCT Pub. No.: WO97/14489

PCT Pub. Date: Apr. 24, 1997

Related U.S. Application Data

[60] Provisional application No. 60/005,538, Oct. 18, 1995.

[51] Int. Cl.$^7$ .................................................. B01D 19/00
[52] U.S. Cl. .......................... 96/209; 55/396; 55/399; 55/452; 55/456; 55/459.4; 96/212; 96/216; 210/512.1
[58] Field of Search .................. 55/396, 397, 399, 55/452, 456, 459.4; 95/261, 271; 96/191, 192, 209, 212, 216; 210/512.1

[56] References Cited

U.S. PATENT DOCUMENTS

| | | | |
|---|---|---|---|
| 1,721,908 | 7/1929 | Heist | 55/397 |
| 1,791,304 | 2/1931 | Flick | 55/397 |
| 2,033,471 | 3/1936 | Keenan | 183/83 |
| 2,147,671 | 2/1939 | Pratt | 55/399 |
| 2,228,401 | 1/1941 | Pressler | 96/212 |
| 2,316,729 | 4/1943 | Tryon | 96/212 |
| 2,472,777 | 6/1949 | Putney | 55/397 |
| 2,705,053 | 3/1955 | Morris | 96/212 |
| 3,698,555 | 10/1972 | Conner | 210/138 |
| 3,724,674 | 4/1973 | Loison | 210/512 |
| 4,668,391 | 5/1987 | Ottens | 210/512.1 |
| 4,959,963 | 10/1990 | Hargrove et al. | 55/396 |
| 5,570,744 | 11/1996 | Weingarten et al. | 55/399 |
| 5,622,545 | 4/1997 | Mazzei et al. | 95/261 |
| 5,755,965 | 5/1998 | Reiber | 210/512.1 |

FOREIGN PATENT DOCUMENTS

| | | |
|---|---|---|
| 810815 | 3/1937 | France. |
| 1557307 | 12/1979 | United Kingdom. |

*Primary Examiner*—C. Scott Bushey
*Attorney, Agent, or Firm*—Londa and Traub LLP

[57] ABSTRACT

A hydrocyclone for separating a combined phase input stream has two nesting truncated, downwardly tapering conical members having an annular space therebetween. A tangential inlet leads to the annular space between the conical members. Alternate embodiments applicable to a hydrocyclone device composed of nesting cylindrical or conical shells forming an annular cyclonic space have passages located on either of the shells to effect an intermediate draw off of a fraction of the flow stream. In addition, a coiled, hollow tube is advantageously situated within the annular space to optimize the flow pattern. Ports may be provided in the hollow tube for removing a gas fraction in counterflow orientation.

15 Claims, 9 Drawing Sheets

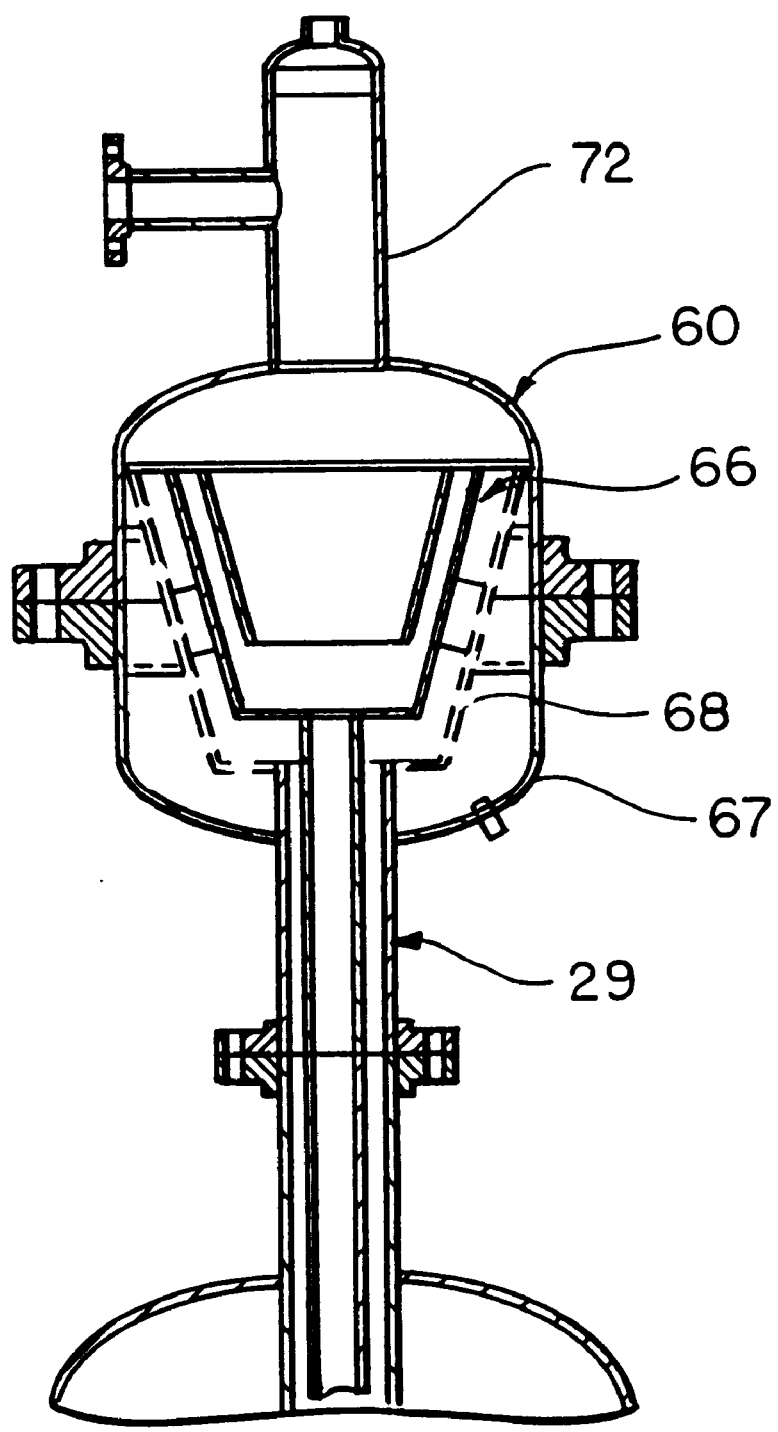
F I G. 10

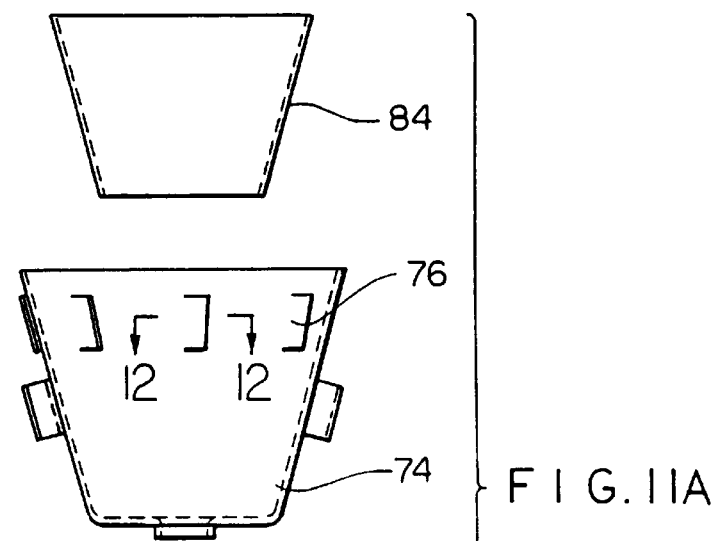
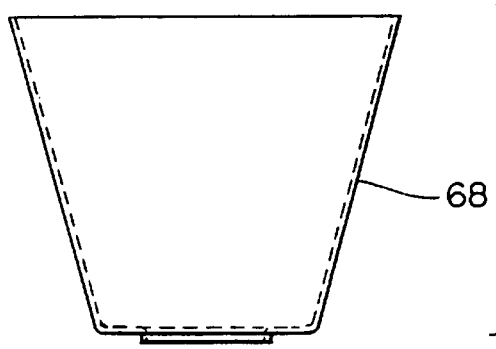
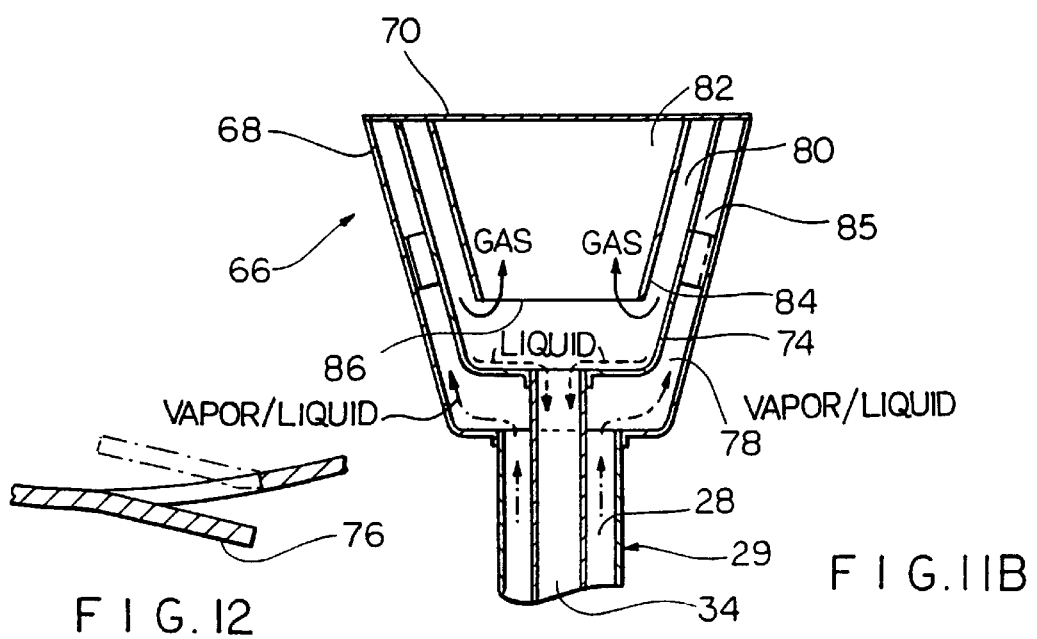
FIG. 11A
FIG. 11B
FIG. 12

HYDROCYCLONE GAS SEPARATOR

This application is a national stage application of PCT/US96/16784, filed Oct. 18, 1996 in accordance with 35 U.S.C. 371, the PCT application claiming priority under 35 U.S.C. 119(e) to U.S. provisional application No. 60/005,538, filed on Oct. 18, 1995, and now expired.

BACKGROUND OF THE INVENTION

1. Field of the Invention

The invention relates to a hydrocyclone apparatus for separating a mixed phase input stream into its constituent parts, such as performing a solid/liquid/gas separation or separation of two immiscible liquids. Separation is effected by differentiation of the phases based on their specific gravity, as a result of centifugal force imparted to the stream by virtue of the cyclonic action.

The claimed system comprises a hydrocyclone specially designed to process this three phase system, characterized by a unique structure comprising a helical cyclonic path situated in a discrete annular conical space between two nesting conical chambers.

2. Description of the Prior Art

In general, a hydrocyclone consists of an inverted conical chamber. A mixed stream, e.g. consisting of liquid/solid or high density liquid/low density liquid, is input into the chamber tangentially, at very high velocity, towards the top of the chamber, i.e. the base of the cone. The high angular accelaration of the stream imparts a centrifugal force which acts upon the different densities of the stream components. The heavier component is thrust against the cone wall, spiraling downward in a helical manner for collection at an outlet port below, while the lighter fraction tends radially inwardly, and upwardly by virtue of the pressure drop created by the cylcone.

Attempts have been made to increase the separation effectiveness by providing a further chamber outside of the principal chamber. Thus, U.S. Pat. Nos. 5,300,222 and 5,407,584, related patents both issued to Broussard, teach an apparatus for separating oil, water, sand and vapor. A cyclone is situated within a large separation tank. The cyclone comprises an outer cylindrical shell and inner coaxial cylindrical shell, and an annular space therebetween. The mixture enters through a circular inlet pipe in a tangential orientation into the annular space. The heavier water and sand are forced to the outside of the space, against the inner wall of outer shell, as the mixture spirals down the annular space. The inner shell ends at a point where the outer shell forms a conically shaped shell. The conical shell portion is hollow, and does not have an annular or conical space defined.

Others have attempted to impart a porosity to the wall of the principal conical chamber, in conjunction with a further chamber situated outside the principal chamber. U.S. Pat. No. 4,048,067 to Cheng teaches a hydrocyclone having a conical annular space. The inner conical wall is perforated and has a porous lining, which is impervious to solids. A solid/liquid mixture enters the inner conical chamber, and the solids are retained in the porous lining while the heavier liquid passes through into the conical annular space, and through an outlet. The retained solids are washed away through a further outlet at the bottom of the inner conical chamber. Lighter liquids are taken up through an outlet in a usual manner and recycled through the system. However, the conical annular space is merely a collecting area for liquids passing through the porous wall. This apparatus relies on the centrifugal force created to enhance the separation of the solids by way of a filtering means. However, this is in some regard working against the cyclonic effect by relying on the lighter liquids to pass out to the outer chamber, while trapping the heavier solids inside the main conical chamber. Furthermore, the filtering means will quickly become clogged with entrained solids, reducing effectiveness, and requiring periodic cleaning.

U.S. Pat. No. 4,097,375 to Molitor teaches a hydrocyclone for separating dissolved salt from a water stream. The lighter liquids tend toward the center of the central cone, and flow out through the top through an upper outlet, with the heavier liquids tending toward the wall of the cone, and eventually flowing out the bottom through a bottom outlet. The liquid containing salt is heaviest, and is circulated by centrifugal force against a wall portion, comprising a porous medium which separates out the salt fraction. The clean water then flows into the annular frustoconical chamber adjacent the wall portion. The action and structure of this device is similar to the Cheng device discussed above, in that in both cases, the porous shells act as filters, retaining the heavier solids within the inner cyclone space, while allowing the clean liquid to pass through to the outer receiving chamber. The same drawbacks apply here.

SUMMARY OF THE INVENTION

Accordingly, the present invention comprises a hydrocyclone for effecting separation of a combined phase input stream, composed of two nesting truncated downwardly tapering conical chambers having a conical annular space therebetween. A tangentially oriented inlet means leads into the annular space between the nesting cones. The width of the conical, annular space is maintained so as to minimize the thickness of the velocity profile of the flow, thereby minimizing unwanted secondary vortices within the flow which may cause remixing, and resulting in a more complete separation. The two nesting shells may reside at least partially within an outer shell.

In addition, further embodiments of the invention reside in connection with a cyclone portion comprising two nesting, coaxial shells having a annular space therebetween, which shells may either be cylindrical or downwardly tapering cones.

Either or both of the two nesting shells may be characterized by perforations or ports throughout. In the case of the inner shell, these ports would communicate with the interior space inside of the shell, and would allow the lighter fraction, e.g. gas and entrained liquid, to pass inwardly for uptake through a centrally located outlet. For the outer shell, the ports would communicate the annular space between the shells with the annular collecting area formed within the outer chamber. The heavier fraction, e.g. including solids and liquid, which is thrust against the outer wall by virtue of its greater density, could then be at least partially withdrawn from the helical path. The medium weight fraction, e.g. liquid, remains within the helical annular path and exits at the bottom thereof.

In a further embodiment, the cyclonic helical downward movement of the input stream is reinforced, controlled and optimized by a structural helical boundary within the annular space which forms a discrete helical path having a generally rectangular cross-section, with an exaggerated length to width ratio in the vertical direction. (While the hydrocyclone embodiments described in this application are oriented in the preferred vertical direction, horizontal orientation is also possible, and therefore "vertical" should be understood as parallel with the axis of the hydrocyclone.) In a more preferred embodiment, the structural helical boundary is formed by a helical tube winding downwardly through the annular space, with the outer faces of the tube acting to form the discrete boundary of the helical path. Advantageously, the tube may have ports situated throughout its lower side to allow for the inlet of gases into the hollow tube. The gases may then travel upwardly through the tube, in a counterflow orientation to the input stream, for further processing upon reaching an outlet at the top of the apparatus.

In a still further embodiment of the invention, a vertically oriented rectangular profile is imparted to the input stream before it enters the annular cyclonic space, by virtue of a transition zone interposed between the flow inlet pipe and the entry point to the annular space.

The invention also resides in a separator apparatus consisting of a hydrocyclone coupled to a secondary gas/liquid separator situated above the hydrocyclone.

BRIEF DESCRIPTION OF THE DRAWINGS

FIG. 10 is a side view of a secondary gas/liquid separator of the invention.

FIG. 11 is an exploded view of the separator of FIG. 10, including an optional third shell within the outer shell.

FIG. 12 is a side cross-sectional view taken along line XII—XII of FIG. 11.

DETAILED DESCRIPTION OF THE INVENTION

A hydrocyclone is a flow through device used to separate a solid/liquid/gas mixture having constituents of different specific gravities into its separate phases. The input stream may consist of any combination of phases, such as solid/liquid, liquid/gas, or all three phases. In the case of a liquid/liquid mixture, it separates the lighter liquid from the heavier liquid. As its name suggests, a hydrocyclone is designed to cause the flow to follow a downwardly tapering helical path, which induces a centrifugal force on the fluid mixture flowing through.

Figure 1:
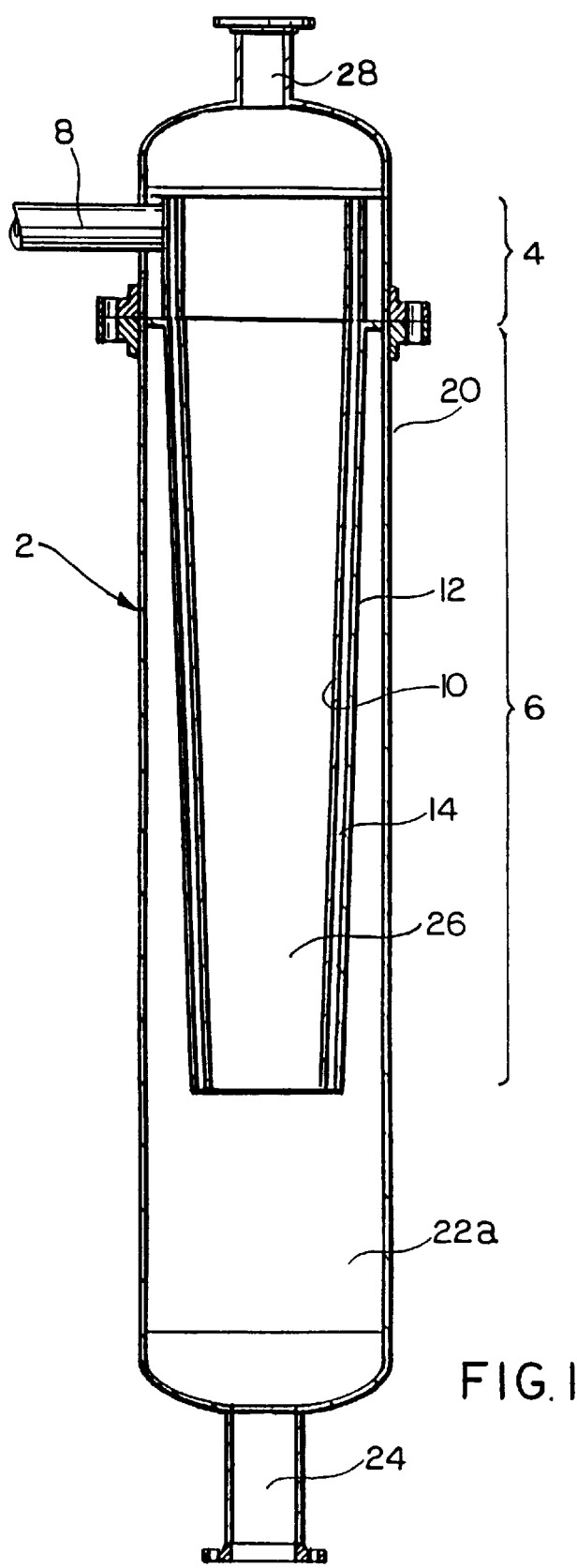
FIG. 1 is a side, cross-sectional view of a basic embodiment of the invention consisting of nesting conical shells.

A first embodiment of the invention is described in conjunction with FIG. 1. The cyclone portion 2 consists of a cylindrical transitional section 4 for receiving the input stream at inlet pipe 8, and transforming the cross-sectional profile of the stream from circular to rectangular. The transitional section 4 leads into a downwardly tapered conical section 6. The operative portion of the conical section 6 is formed by two nesting, coaxial truncated cones having an identical angle of ascent, inner cone 10 and outer cone 12, which form a conical, annular space 14 therebetween. Because of the high velocity of the input stream, which is directed tangentially into the cyclone, the stream flows downwardly in a helical path within the conical annular space 14. The width of the annular space is determined, in conjunction with the rectangular profile of the transition nozzle, so as to enhance the basic cyclonic effect. That is, by providing an inner conical wall in addition to the usual standard outer conical wall, the thickness of the flow is controlled within this constricted cross-section. The result is a reduction in the occurrence of secondary flow vortices and other unwanted turbulence-causing effects, which can cause remixing. Thus, the separation which occurs by virtue of the centrifugal force acting on the differing phase densities can be maximized. As the flow exits from the bottom of the conical annular space, the phase separation is relatively well defined.

Figure 2:
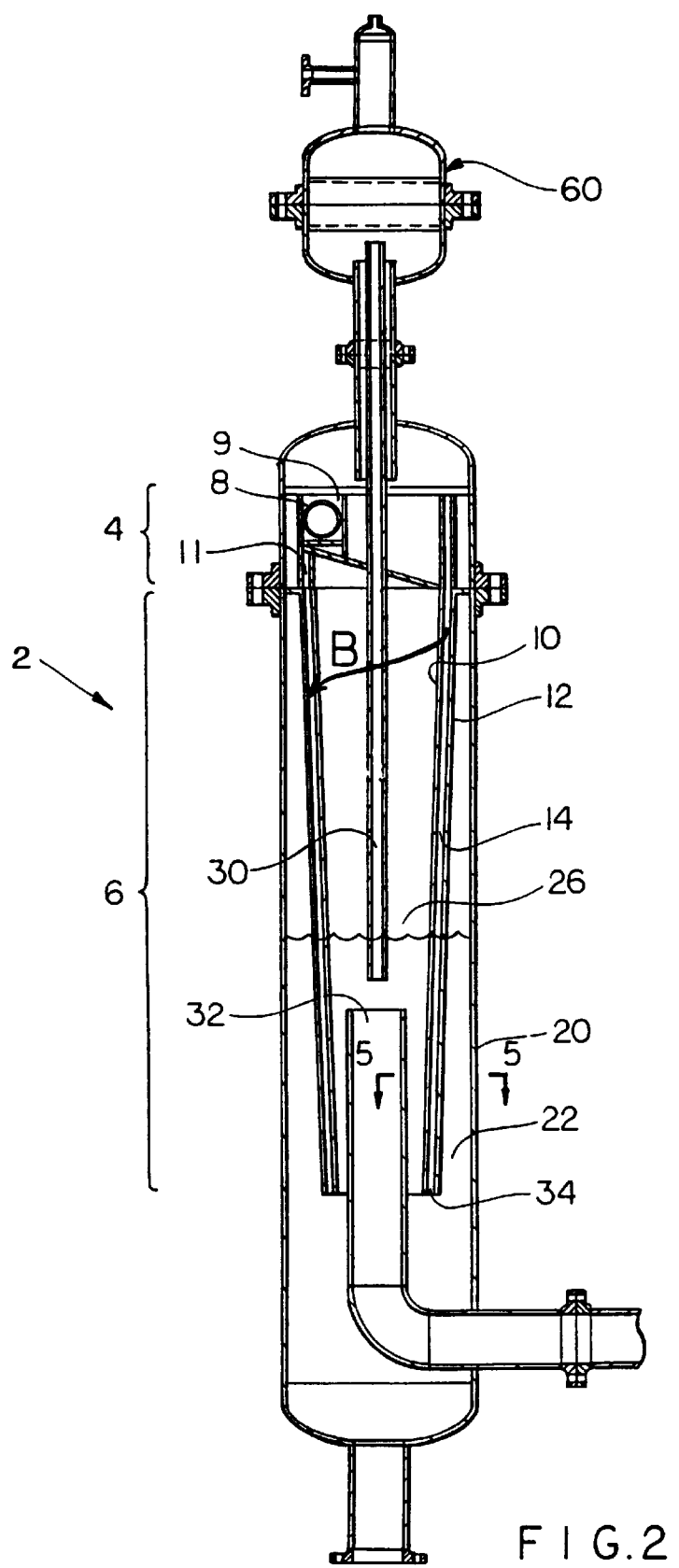
FIG. 2 is a side, cross-sectional view of an alternate embodiment of the invention.
Figure 3:
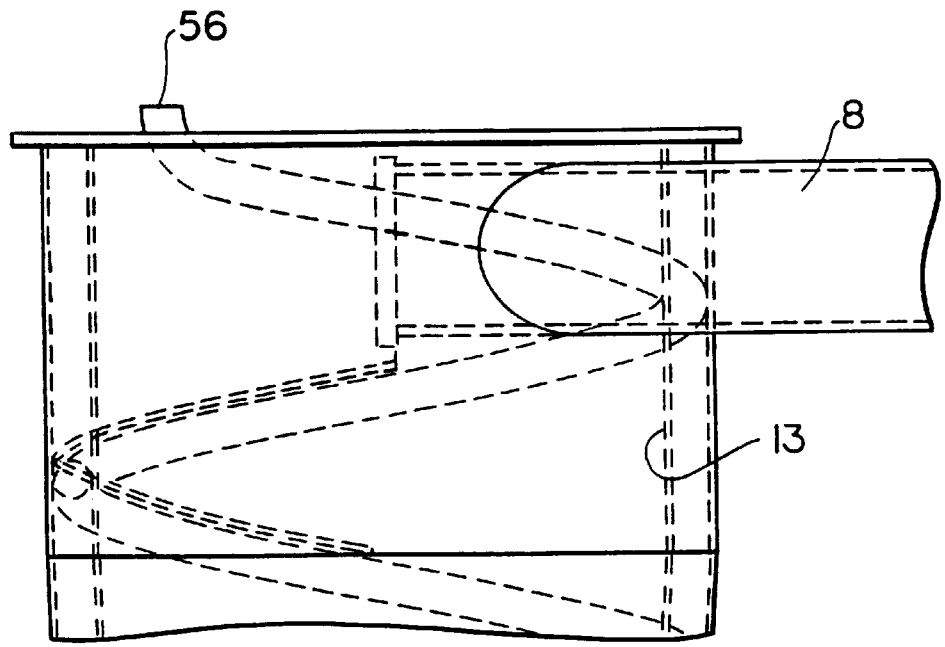
FIG. 3 is a side view of the transitional section of the apparatus shown in FIG. 6.
Figure 4:
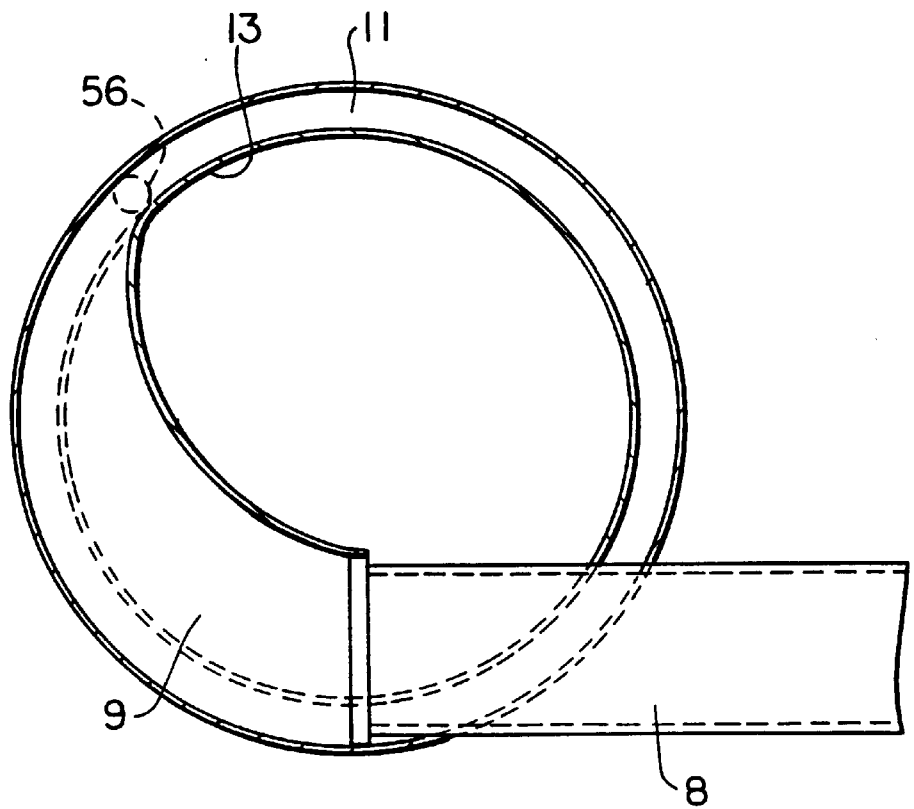
FIG. 4 is top plan view of FIG. 3.

A further embodiment of the invention, including a particular transition zone and nozzle, is shown in more detail in FIGS. 2–4. The additional features described herein, as well as others described below, can be applied to the conical hydrocyclone described above (and as shown in the drawings), as well as to a hydrocylone having two cyclindrical shells in place of the conical shells. A mixed phase stream enters the cyclone under very high velocity through inlet 8 into transition nozzle 9, which is constructed to transform the stream into one having a narrow vertical rectangular profile 11, for reasons which will be explained below. The inlet nozzle 9 protrudes inside the body of the transition section 4, situated horizontally and tangentially with respect to the inside wall 13 of the transition section. The nozzle is formed so as to transform the profile of the stream without causing turbulence, i.e. no abrupt change in flow should result which would unduly complicate processing within the cyclone. In order to provide the most advantageous degree of turbulence, it has been found that the aspect ratio of the rectangular profile should be at least 2:1 in the vertical direction (i.e. in the direction parallel to the axis of the shells), and will likely be closer to 6:1, and as high as 12:1 or more. Those skilled in the art will be able to determine the optimum profile based on the detailed discussion which follows.

The helical path, beginning as the nozzle 9 transitions into the rectangular cross-section space 11, winds into the cyclone section 6 and begins its descent downward under centrifugal force. Because of the extreme force exerted on the stream by virtue of the tightly wound helical path, the mixture is separated into its three phases based on density. The heavier fraction is forced radially to the outside of the annular space, against the inside wall of outer shell 12. Upon exit from the annular space, the heavy fraction drops gravitationally into the collection area 22a, formed by a downward extension of an outer vessel 20, and then may be removed through outlet 24. The light fraction (e.g. gas and/or liquid) is drawn upward through center area 26 towards outlet 28. The hydrocyclone may also have an outer vessel 20 surrounding the outer shell 12 to form an annular space 22 therearound, leading into the collection area 22a.

Figure 5:
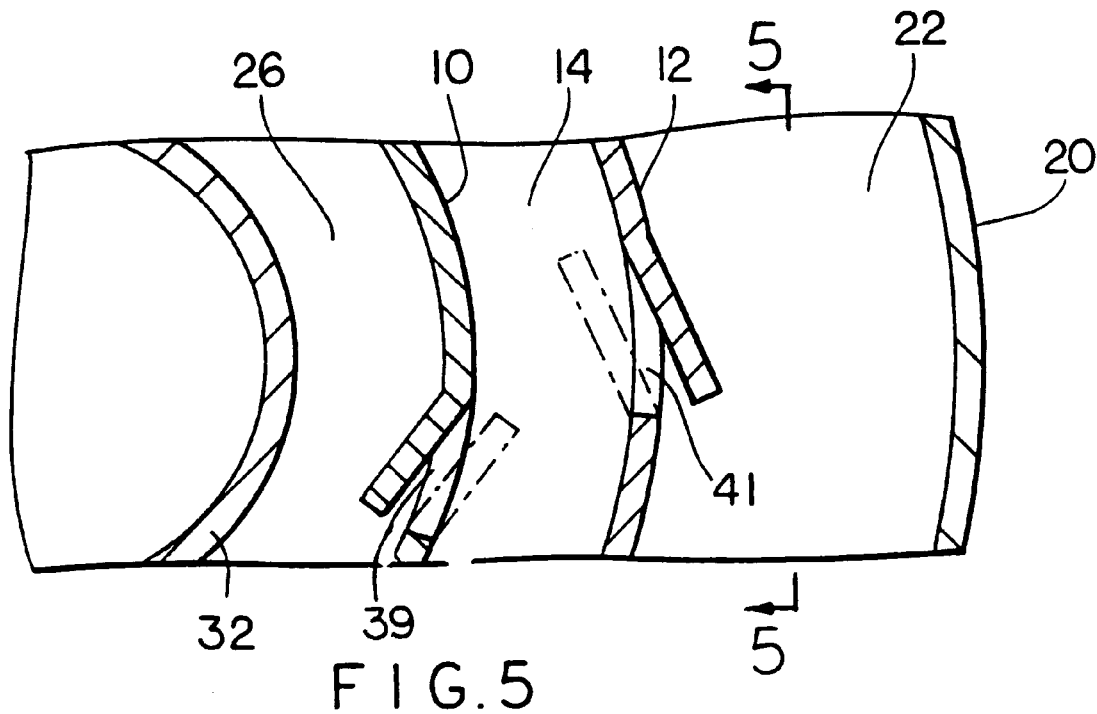
FIG. 5 shows an enlarged cross-sections along lines V—V, of FIG. 2, in an embodiment having passage means in the shells.
Figure 5A:
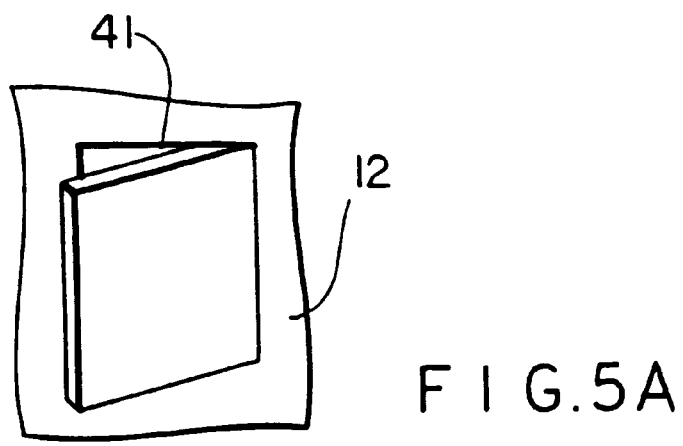
FIG. 5A is a side view taken along line Va—Va of FIG. 5.
Figure 6:
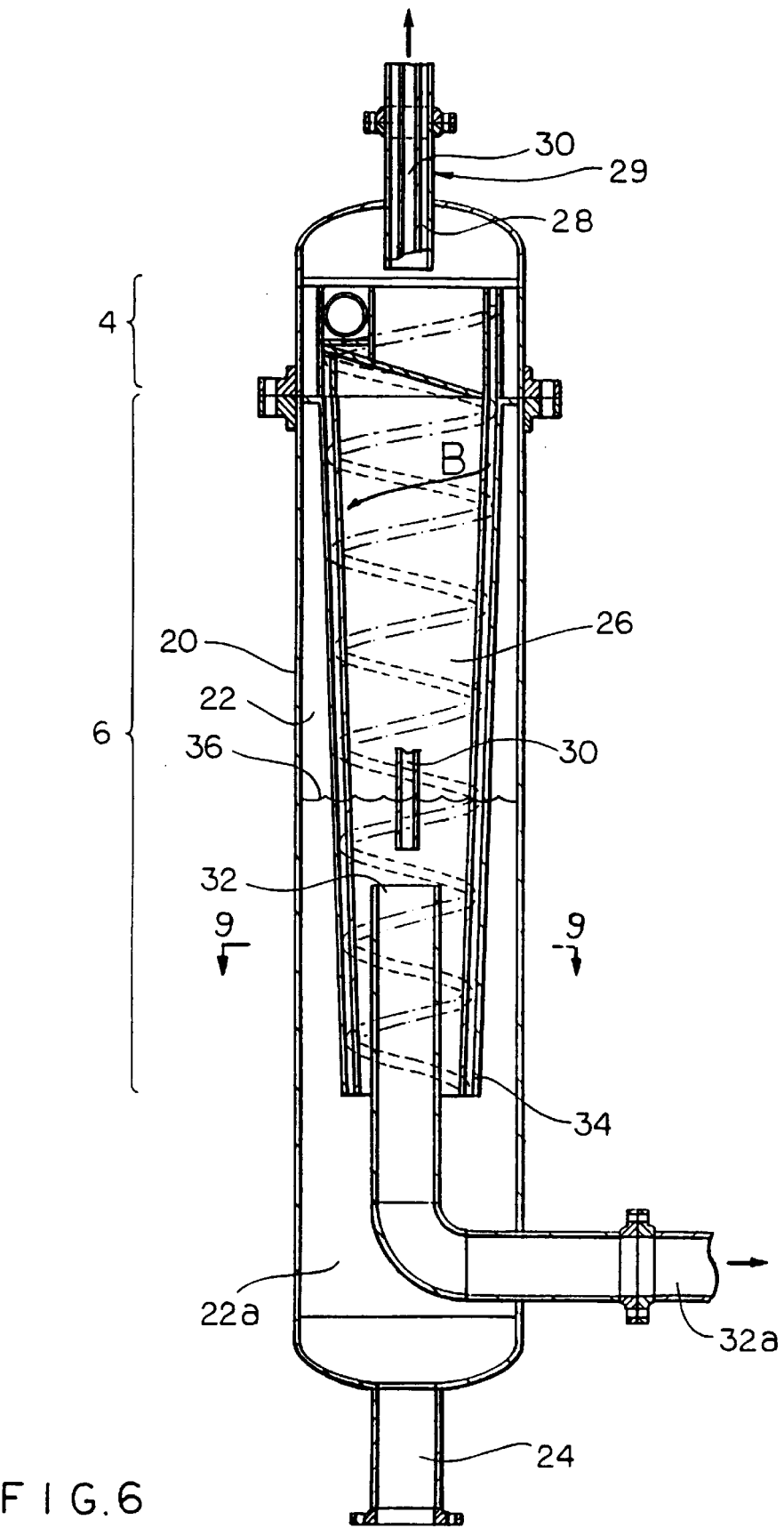
FIG. 6 is a side view of an embodiment of the invention having a helical tube within the annular space.
Figure 7:
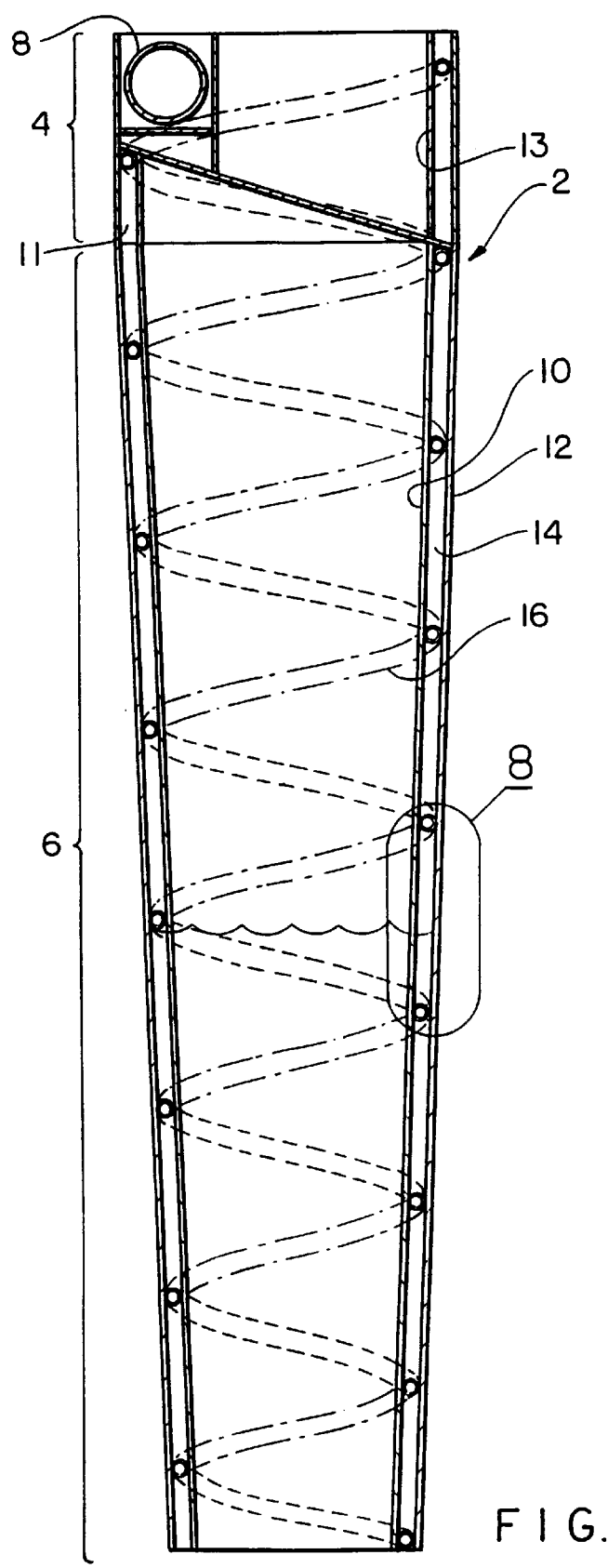
FIG. 7 is a detail of FIG. 6.
Figure 8:
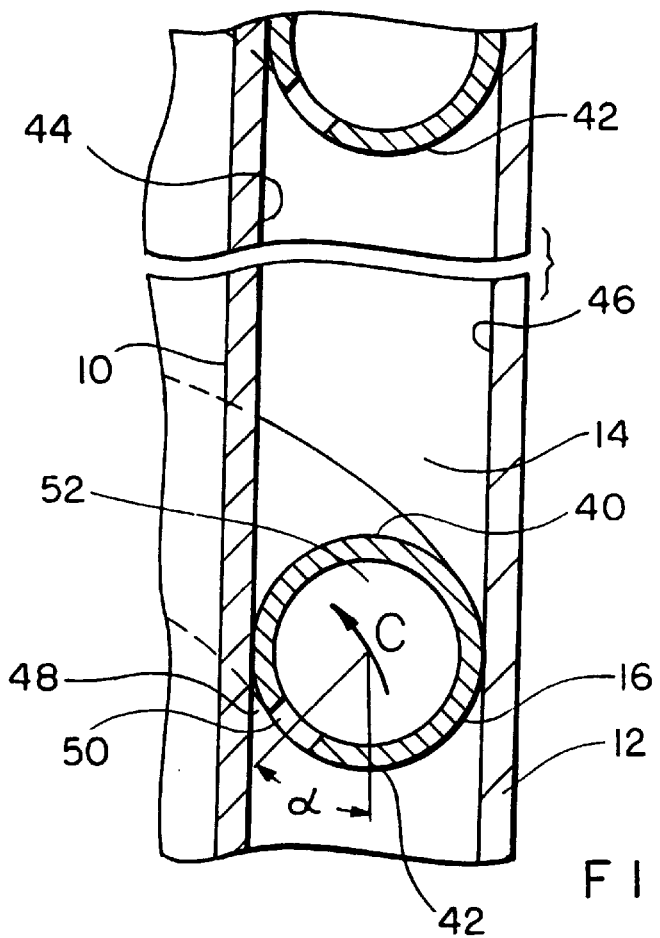
FIG. 8 shows an enlargement of area A of FIG. 7.
Figure 9:
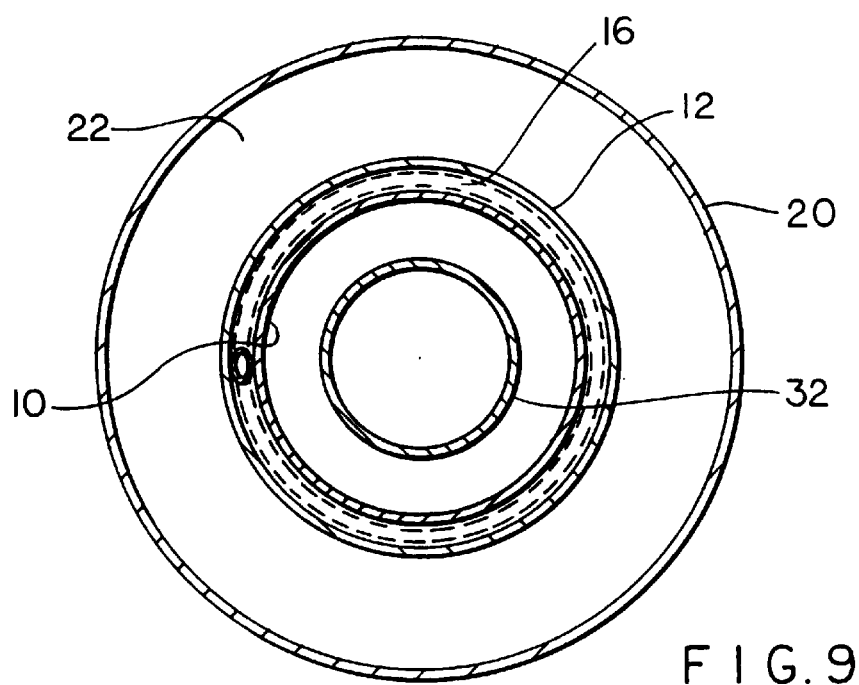
FIG. 9 shows a cross-section taken along line IX—IX of FIG. 6.

Another embodiment of the invention, which may be used alone or in conjunction with other embodiments described, is shown in detail in FIGS. 5 and 5A. The embodiment comprises passage means located in the walls of either or both of the inner and outer shells, to provide fluid communication with the adjacent region, and can be used to enhance the separation of different phases. In the case of the inner shell, the inner shell passage means 39, in the form of ports, vanes or perforations which communicate the annular space with the interior region 26, act to draw off the lighter fraction, e.g. gas and entrained liquid, from the helical flow into the region 26 for removal through an uptake 28. The passage means 39 should be located below the uptake 28. Likewise, the outer shell may have outer shell passage means 41 which communicate the annular space with the annular outer collecting area 22 formed between the outer vessel 20 and the outer shell 12, and which act to draw off the heavier fraction, e.g mixed solid and liquid. If either or both of the inner shell passage means or outer shell passage means are present, the remaining, medium weight fraction, e.g. consisting mostly of liquid, will continue to flow down the helical path for exit at the bottom thereof. The number, size and location of the passage means will be determined by those skilled in the art based on the particular inlet flow, among other factors. Thus, for example, if solids are present, a series of passage means 41 may be situated toward the bottom of succeeding turns of the helical path. FIGS. 5 and 5A show one manner in which a passage means can be constructed, namely by forming a cut-out vane in the shell. However, any type of passage means which is capable of drawing off a particular fraction of the flow may be used.

As the solids and gas exit the annular space through their respective exit ports, the liquid remains within the helical path, continuing to spiral downwardly therethrough. At the bottom of the path 34, generally defined by the truncation point of the shells 10, 12, the liquids enter the collection area 22a. A heavier fraction, e.g. consisting of mixed solid/liquid, exiting from the bottom of the helical path and/or radially through the outer shell passage means, collects in the region 22a toward the bottom of the outer shell, for extraction through an exit port 24, and further treatment, while the lighter liquid rises within the collection area to be removed through overflow pipe 32 opening upwardly within the center area of the cyclone, or through outlet 28.

An operating level of liquid is maintained within the cyclone, above the overflow pipe, and in conjunction with a drain-off associated with the overflow exit 32a. In order to avoid remixing, it should be clear that both the opening of the overflow pipe and the operating liquid level should be situated above the bottom exit from the helical path, as well as above any outer shell passage means that may be present.

With reference to FIGS. 6–9, a further embodiment of the apparatus comprises a structural helical path defining means consisting of a helical dividing means situated within the annular space, bridging the width between the inner shell and the outer shell, and defining the helical path between successive turns of the helical dividing means 16. For reasons explained below, the dividing means 16 is advantageously formed by a coiled length of round cross-section residing within the annular space 14, whereby the outer sides of the coiled length act as boundaries to the helical path.

It is even more advantageous if the coiled length is formed of a hollow tube. In addition to providing ease of manufacture with respect to a helical plate (and for this reason, a solid rod of rounded cross-section may also be used), the tube may also provide further operational advantages, discussed below. As shown in detail in FIG. 7, the contact points between the lateral sides of the tube and the walls of the shells act to allow the lower 42 and upper 40 sides, respectively, of succeeding turns of the tube to act as upper and lower inwardly arced sides of the "rectangular" helical path. Since the essentially rectangular cross-section 14 of the path is highly longitudinal, the inwardly convex nature of the shorter, lateral walls of the rectangle formed by the tube do not appreciably affect the cyclonic action, and can be taken into account when analyzing the flow patterns.

Nevertheless, when gas is present in the flow stream, the corner 48 formed between the lower part 42 of the outside tube wall and the outside wall 44 of the inner shell, i.e. the upper, inside corner of the rectangular cross-section of the helical path, does act to form an area generally free of liquid or solid matter. Thus, a series of perforations 50 through the tube 16, along the length thereof, which perforations communicate the inside of the helical path 14 with the inside of the hollow tube 52, can be provided to allow for withdrawal of gases from the cycloning, mixed input stream. The size, spacing and number of perforations depends on the ratio and nature of the gas in the mixture and the rate of its emulsion within. These gases tend toward the upper part of the helical path, and thus may flow into the hollow tube, for passage upwardly through the tube in counterflow fashion (direction of arrow C) to the downwardly cycloning input stream, for withdrawal at an outlet port 56. An advantageous location of the perforations has been found to be with the centers thereof situated at an approximate 45° angle, shown as $\beta$, with respect to the horizontal diameter running through the lateral cross-section of the tube.

The system may consist solely of the cyclone described above in its various embodiments, or may further advantageously comprise a secondary gas/liquid separator 60 situated thereabove, shown in FIGS. 10–12. In addition, it is possible that the secondary gas/liquid separator arrangement may be used with hydrocylcones other than those described presently. Gas with entrained liquid flows from the cyclone 2 up through column 28, which acts as an inlet to the gas/liquid separator 60. In addition, separated gas flowing through hollow tube 16 may also be fed into the secondary separator.

The separator 60 may have a generally cylindrical shell 67. The column 29 may consist of two concentric pipes, a gas/liquid uptake 28 surrounding a liquid return pipe 30. To avoid short circuiting of the separation cycle, the return pipe 30 should extend below the liquid operating level in the main apparatus 2, while the uptake 28 should be above said level. The uptake 28 leads into a seconday separation system 66. The separation system 66 comprises a series of nested coaxial shells. Outer shell 68 opens out in the upward direction from the inlet uptake 28, and is closed on top by wall 70 to form a generally closed system except for liquid and gas exit ports. In an alternate embodiment, shown in FIG. 10, the outer shell 68 (shown as a dotted line) may be dispensed with, and the shell 67 may perform the same role. Gas exit port 72 extends upwardly through the center of wall 70. A first inner shell 74 resides inwardly of and spaced apart from outer shell 68, forming an annular space 78 therebetween. A mixed gas/liquid stream enters through uptake 28 and flows into space 78 in an upward orientation. The flow is then abruptly reversed as it passes through inlet ports 76 present towards the upper portion of first inner shell 74 into a second annular space 80 formed between first inner shell 74 and second inner shell 84 residing spacedly within the first inner shell. Preferably, as shown in FIG. 11, the ports 76 are formed as horizontally directed vanes, which direct the flow into space 80 in an initially tangential direction, which then continues to spiral cyclonically downward through space 80. The abrupt change of direction, and subsequent cyclonic flow in space 80, acts to impart a separation, so that the liquid tends to fall gravitationally downward through return pipe 30 extending from the bottom of shell 74, while the gas (possibly with some remaining entrained liquid) rises through the open bottom of shell 84 to an outlet.

The secondary separator may also be constructed to provide additional separation forces based on cyclonic helical flow in similar fashion to the main cyclone, if the gas/liquid inlet is directed tangentially into the secondary separator. In this case, the annular spaces 78, 80 should be free of structural spacers 85 or the like, which may be present in the non-cyclonic embodiment of the secondary separator, but which would impede helical flow.

The theory and operation of the apparatus will now be described, as well as the considerations which go into choosing the proper configuration parameters. While one method of separator design is set forth below, those skilled in the art will appreciate that the particulars of the design according to the invention can be arrived at through any known technique.

The centrifugal force induced on a given particle within the flow field is related to the radius of the helix at that point, the mass of the particle and its tangential velocity by the following formula:
Where
F=force acting on particle $$F = \frac{mv_t^2}{r}$$

m=mass of particle
$v_t$=tangential velocity of particle
r=radius of helix

Hence, two particles of equal volume but of different densities flowing at the same tangential velocity and at equidistant points from the center of the helix, will experience different centrifugal forces. The more dense particle will undergo a greater centrifugal force and therefore will tend to move further out than the lighter particle. In a mixture, the heavier particle will move to the outermost radial boundary of the helix, forcing the lighter particles to be displaced inward, thus causing separation. Hence, separation in a hydrocyclone is directly proportional to the difference in the specific gravities of the fluids to be separated:

$$F_{sep} = \frac{(\rho_2 - \rho_1)v_t^2}{r}$$

In a hydrocyclone where the physical properties of the fluids to be separated is constant, separation can be improved by maximizing the normal acceleration:

$$a_n = \frac{v_t^2}{r}$$

This can be achieved by either increasing the tangential velocity of the fluid or reducing the diameter of the helix. For a fixed flow rate, considering that the flow is incompressible, the tangential velocity can be increased by reducing the cross-sectional area of the flow. This also leads to higher Reynolds numbers and increased turbulence which may cause remixing. Increasing velocity will yield an increase in frictional losses, i.e. pressure losses, in the device creating a demand for a larger pumping source. Hence, it is advantageous to maximize the velocity while maintaining pressure losses and turbulence within acceptable ranges. For example, the economic pipe velocity range for water is between 4.4 and 8.8 ft/sec (1.3 and 2.7 m/sec). The main objective is to achieve high separation efficiency. Hence, to maximize the normal acceleration without drastically affecting operating cost, the flow velocity must be maintained in the neighborhood of the high range (8.8 ft/sec; 2.7 m/sec). This, however, increases the Reynolds number which in turn increases turbulence. The Reynolds number is defined as:

$$Re = \frac{QD_h}{A\nu}$$

where
Q=is the flow rate
A=the cross-sectional area of the flow channel
$\nu$=kinematic viscosity of the fluid
$D_h$=Hydraulic diameter of the flow channel
where $$D_h = \frac{4A}{P}$$

where P is the wetted perimeter
Hence, the Reynolds number becomes $$Re = \frac{4Q}{\nu P}$$

To minimize the Reynolds number for a given fluid flowing at a constant flow rate, the wetted perimeter of the channel must be increased without increasing its cross-sectional area in order not to reduce the average velocity and maintain a high normal acceleration. Hence, P must be maximized for a constant A. For a rectangular channel,

A=HW where
H=height of channel
W=Width of channel
and

P=2(H+W)

Combining the above two equations $$p = 2\left(\frac{A}{W} + W\right)$$

deriving with respect to W and setting the derivative equal to zero, leads to the minimum wetted perimeter for which H=W (square channel). Hence, for the same cross-sectional area, the wetted perimeter can be increased by increasing the length of one side of the rectangular channel while decreasing the other in inverse proportion, keeping in mind that the channel must be practical to manufacture.

Therefore, in order to keep the average tangential velocity high and minimize the Reynolds number, and thus turbulence, the flow channel must be essentially thin, slitlike and rectangular.

In determining the orientation of the major axis of the rectangular channel with respect to the axis of revolution of the helix, the following is considered. In a helical flow channel, secondary flows exist because the fluids nearest the center of the tube which have a higher velocity are acted upon by a larger centrifugal force than the slower particles near the wall. This secondary flow is directed outward in the center and back and around near the wall forming counter-rotating flow loops. Also, the fluid nearest to the axis of the helix is subjected to a greater centrifugal force than the liquid furthest from the axis of the helix further aiding the formation of these secondary flows. These secondary flows can be reduced by minimizing the distance between the inner and outer wall of the flow channel. Hence, the major axis of the rectangular channel must be essentially parallel to the axis of the helix. These secondary flows are more pronounced in laminar flow than in turbulent flow since in laminar flow the velocity profile varies throughout the cross-section of the tube whereas in turbulent flow it is essentially flat except within the boundary layer.

Goertler vortices can also be generated in flow through a channel following a helical path. These vortices are similar to Taylor vortices in nature and are generated in the boundary layer on a concave wall (the outer cone) and are caused by the velocity gradient across the boundary layer. If the flow is laminar, the velocity gradient will be non-zero throughout the channel and the Goertler vortices will extend from the outer wall to the point of max velocity. A flat velocity profile will eliminate these vortices in the body of the flow and limit their existence to the laminar sublayer. This is only attainable with a turbulent velocity profile.

Turbulent flow increases mixing of the pre-separated or stratified fluids and/or solids and the Brownian motion generated in turbulent flow may prevent the very small fluid bubbles or solid particles from migrating to a common location and agglomerating. Furthermore, turbulent flow causes mixing at the microscopic level which may weaken stratification while laminar flow induces vortices and secondary flows at the macroscopic level which can be even more detrimental. Therefore, the flow in the channel should be in the turbulent range with control over the turbulence intensity. Turbulence intensity is increased by the rubbing and bouncing of the fluid particles against the microscopic protuberances in the material forming the channel walls. These particles will impact other particles closer to the core creating a domino effect. A smooth wall will generate less turbulence than a rough wall. Hence, the importance of channel material selection.

Turbulence due to surface roughness can be overcome by keeping the flow "hydraulically smooth", i.e., allowing the height of the laminar sublayer to exceed the height of the protuberances to form a "coating" between the walls of the channel and the core of the flow. The impact of a fluid particle with a protuberance along the wall is dampened and absorbed within the laminar boundary sublayer without affecting the core of the flow making frictional losses a function of the Reynolds number only (independent of surface roughness). In order to obtain a "hydraulically smooth" flow, the frictional Reynolds number must satisfy the inequality $$\frac{\varepsilon v_*}{v} < 5$$

where
$\varepsilon$=The surface roughness of the material
$V_*$=The frictional velocity
$v$=The kinematic viscosity of the fluid.

And where the frictional velocity may be expressed as:

$$v_* = 0.150 u^{\frac{7}{8}} \cdot \left(\frac{v}{y}\right)^{\frac{1}{8}}$$

where
u=local velocity
y=Distance from wall of tube

Due to the Von Karman Similarity Hypothesis for shear velocity, for a circular tube, the local velocity and distance from wall can be replaced by the maximum velocity and tube radius without affecting the value of the shear velocity. Using the power law, the maximum velocity can be expressed in terms of the average velocity in turbulent pipe flow. The radius can also be replaced by half the hydraulic diameter to obtain an equation that is applicable to rectangular pipe and where the average velocity can easily be substituted for by the flow rate.

From the previously provided inequality for defining "hydraulically smooth" flow, the maximum allowable shear velocity under this condition is:

$$v_* = \frac{5v}{\varepsilon}$$

Knowing the type of material to be used for the channel walls and the kinematic viscosity of the fluid to be treated at a pre-determined flow rate (based on application) the exact minimum dimensions of the channel can be obtained for a pre-established cross-sectional shape by combining the above equation with that of the shear velocity expressed as a function of the flow rate. Hence, we will have the smallest cross-sectional area capable of providing "hydraulically smooth" flow at the highest possible velocity for the chosen geometry (in our case, long thin rectangular for all the previously stated reasons).

Thus, the velocity can be maximized to yield a higher centrifugal force, while minimizing the Reynolds number and keeping turbulence intensity under control.

As discussed above, the helical dividing means 16 may be advantageously formed by a tube bent around at a constant pitch equal to the desired height of the channel, and sandwiched between two concentric cylindrical or conical plates 10, 12. Where, if a conical configuration is used, the maximum half angle of the cone can be determined by:

$$\alpha = \arctan\left(\frac{g}{a_n}\right)$$

where
$\alpha$=the maximum half angle of the cone
g=acceleration due to gravity
$a_n$=the maximum normal acceleration generated at the minimum helix radius.

In rectangular channels, there are always secondary flows towards the corners along the half angle line and back out along the edges. These secondary flows will remain when the two short edges are replaced by tubes. However, choosing a rectangular tube with a large aspect ratio will limit the effects of these secondary flows to the two edges of the channel thus limiting their effect on the bulk of the flow.

The centrifugal force can also be maximized by minimizing the radius of the helix. In the configuration where the one light-liquid outlet is on top and one heavy liquid outlet is in the bottom with no concentric pipe going through the center of the cone, the minimum radius should be essentially equal to the radius of the top pipe in order to prevent "choking" the light liquid as it starts moving upward through the center of the cone. In the configuration where the concentric pipe 32 going through the center of the cone is used, i.e., when gases are also present, the minimum radius of the inner cone/cylinder wall 10 is also the outer radius of the annulus formed by the concentric pipe 32 and bottom of inner cone and in which the separated lighter liquid rises. Again, to minimize "choking" the minimum cross-sectional area of the annulus should be essentially equal to the area of the concentric pipe 32. This equality yields the minimum radius of the cone whereas the radius of the concentric pipe is obtained such that the flow therethrough is optimized, as is well known to those versed in the field. Having obtained the minimum radius, the maximum allowable normal acceleration can be obtained.

As the flow exits the bottom of the annular space 34, it continues spinning while the lighter liquid is extracted through the center area 26 and the heavier liquid/solid is swung to the outside as it migrates to the bottom 22a of the outer shell 22 enclosing the hydrocyclone. The minimum depth of this chamber should be such that, whether the heavy liquid/solids are extracted continuously or in batches, they do not accumula te more than three (3) inner cone radii or three (3) annulus spaces from the bottom 34 of the helix channel 14 to minimize re-entrainment, depending on which light liquid extraction configuration is used. However, these parameters will vary depending on the application.

The number of revolutions in the helix is also an important factor in separation. The flow must be fully developed and free of entrance effects prior to obtaining effective separation. In turbulent flow, the entrance length is defined as:

$$\frac{L_e}{D_h} \approx 40 \text{ to } 100$$

Since the inlet 8 to the hydrocyclone is a circular pipe and the channel is rectangular with a high aspect ratio, having a smooth transition section from a circular cross-section 8 to a rectangular cross-section 11 will help minimize entrance length effects. For ease of manufacturing, the current transition may be formed to change abruptly from a circular cross-section 8 to a square cross-section 9, then to transition to the rectangular cross-section 11 with the desired aspect ratio. This transition is formed by two concentric cylinders having a space in between them equal to the width of the flow channel and where the inner cylinder is gradually rolled at a tighter radius in order to match the circular to square transition plate. The top of the transition is sealed with a flat horizontal plate and so is the bottom. The bottom plate is inclined such that the transition from square to rectangular occurs at preferably a slope of 15°, the recommended angle for diffusers. However, this may be overlooked where ease of manufacturing is concerned, since a change in cross-sectional geometry does not always lead to an increase in cross-sectional area. Hence, having a smooth transition, the minimum required entrance length is:

$$L_e = 40 D_h$$

Therefore, the minimum number of revolutions required to attain fully developed flow is $$\Omega = \frac{40 D_h}{2\pi}$$

It is safe to assume that effective separation occurs beyond this point. The number of revolutions required to achieve adequate separation is dependent upon several variables such as the difference in specific gravity between the fluids to be separated, their viscosities (especially that of the carrying fluid), particle size and interfacial tension. In order to simplify, having a given particle size distribution in a known carrying fluid, the radial terminal velocity of the sphere can be estimated. The width of the channel and the average flow velocity being known, the minimum number of revolutions in the fully developed flow regime can be estimated. It is estimated that a standard design would have at least six (6) revolutions.

We claim:

1. A hydrocyclone for effecting separation of a combined phase input stream, comprising an inner shell residing concentrically within an outer shell, the two shells forming an annular space therebetween of constant width, a tangentially oriented inlet means leading into the annular space, and an outlet means communicating with the annular space, wherein the inlet means is circular in cross-section, and wherein a transition means is provided connectingly between the inlet means and an entry point into the annular space wherein the cross-section of a path of flow of the input stream is changed from circular to essentially rectangular, wherein the length of the rectangular cross-section parallel to the axis of the two shells is greater than its width, wherein the inner shell and the outer shell are each formed as truncated cones tapering in the direction away from the inlet, the truncated cone of the inner shell being terminated at the same level as the truncated cone of the outer shell.

2. The hydrocyclone of claim 1, wherein the inner shell and the outer shell are cylindrical in the region of the transition zone, and are shaped in a region below the transition zone as truncated cones tapering in a direction away from the inlet.

3. A hydrocyclone for effecting separation of a combined phase input stream, comprising an inner shell residing concentrically within an outer shell, the two shells forming an annular space therebetween of constant width, a tangentially oriented inlet means leading into the annular space, an outlet means communicating with the annular space, a helical means situated within the annular space, bridging the inner shell and the outer shell, and defining a discrete helical path between successive turns of the helical means within the annular space, the helical path being defined laterally by the outer wall of the inner shell and the inner wall of the outer shell, and longitudinally above by a bottom surface of a first portion of the helical means and below by an upper surface of a succeeding spiral portion of the helical means, wherein the helical means is formed by a coiled length of a structure having a circular cross-section.

4. The hydrocyclone of claim 3, wherein the helical means is a hollow tube, an outside wall of the tube acting to define the helical path as the shorter sides of an essentially rectangular cross-section.

5. The hydrocyclone of claim 4, wherein the hollow tube has tube passage means communicating the space within the helical path defined by the outside of the tube to the hollow inside of the tube for permitting passage of gases therethrough, whereby said helical tube acts to carry said gases upwardly in counter flow with respect to the downwardly spiraling inlet flow within the helical path.

6. The hydrocyclone of claim 5, wherein said tube passage means comprises a plurality of ports located along a bottom half of said tube acting as the upper side of the essentially rectangular cross-section of the helical path.

7. The hydrocyclone of claim 6, wherein the ports are located towards the outer wall of the inner shell.

8. The hydrocyclone of claim 7, wherein the ports are located at an angle of approximately 45° to a horizontal diameter of the tubes.

9. The hydrocyclone of claim 3, wherein the inner shell and the outer shell are each formed as downwardly tapered truncated cones.

10. The hydrocyclone of claim 3, wherein the helical path is essentially rectangular in cross-section, having a length of the cross-section in an axial direction of the shells being greater than a width, wherein the ratio of the length of the rectangular cross-section to the width is at least 2:1.

11. The hydrocyclone of claim 3, wherein the tangentially oriented inlet means leads into a transition zone of the annular space, and an outlet means communicating with the annular space, wherein the inner shell and the outer shell are cylindrical in the region of the transition zone, and are shaped in a region below the transition zone as truncated cones tapering in a direction away from the inlet.

12. A separator apparatus for separating a combined phase input stream composed of at least a gas and a liquid, comprising a hydrocyclone coupled to a secondary separator, the hydrocyclone comprising an inner shell residing concentrically within an outer shell, the two shells forming an annular space therebetween of constant width, an inlet leading into the hydrocyclone, an outlet leading out of the hydrocyclone, an uptake port for removing a light fraction separated from the input stream within the hydrocyclone from a collection area located radially inward from the shell and leading upwardly from a point above a liquid operating level of the hydrocyclone into said secondary separator, a return port leading from said secondary separator downward into the hydrocyclone and having an outlet point below said operating level.

13. The separator apparatus of claim 12, wherein the uptake port is formed as an annular space between an outer column and an inner column comprising the return port.

14. The separator apparatus of claim 12, wherein the secondary separator comprises an outer annular chamber being closed at the top thereof, the outer annular chamber communicating with an inner conical annular chamber of constant radial width, coaxial with the outer annular chamber, by way of passage means located on a conical shell defining an inner wall of the outer annular chamber and an outer wall of the inner annular chamber, the inner annular chamber communicating at a truncated bottom thereof with the liquid return outlet, the inner annular chamber communicating with an upwardly tapering conical chamber residing coaxially within the inner annular chamber, and truncated at an open bottom thereof to provide communication with the inner annular chamber to allow passage of separated gas and/or light liquid fraction into the conical chamber and out through an outlet leading out from the top of the conical chamber.

15. The separator of claim 14, wherein the passage means are formed as horizontally oriented vanes which direct the flow tangentially into the inner annular chamber.

* * * * *